United States Patent [19]
Pape et al.

[11] 3,797,339
[45] Mar. 19, 1974

[54] APPARATUS FOR CUTTING GLASS

[75] Inventors: Heinz Pape; Heinz-Josef Reinmold, both of Aachen, Germany

[73] Assignee: Saint-Gobain Industries, Neuilly sur-Siene, France

[22] Filed: Sept. 20, 1971

[21] Appl. No.: 181,877

[30] Foreign Application Priority Data
Sept. 22, 1970 France .............................. 7034233

[52] U.S. Cl. .................... 83/12, 83/318, 83/487, 83/575, 83/614, 318/121
[51] Int. Cl. ............................................. B26d 3/08
[58] Field of Search ..................... 83/6, 7, 10–12, 83/575–577, 614, 487, 555, 318; 318/121; 408/125

[56] References Cited
UNITED STATES PATENTS

| 2,514,116 | 7/1950 | Baker ............................ 408/125 X |
| 3,496,817 | 2/1970 | Staats et al. ..................... 83/577 X |
| 3,198,044 | 8/1965 | Clin .................................. 83/12 X |
| 1,842,806 | 1/1932 | Shonnard et al. ................ 318/121 X |
| 3,633,447 | 1/1972 | Casida ............................. 83/614 X |

Primary Examiner—J. M. Meister
Attorney, Agent, or Firm—Pennie & Edmonds

[57] ABSTRACT

Apparatus is provided for cutting glass, particularly for cutting sheets from the advancing end of a ribbon of formation, in which the motive power for the scribing tool is a linear induction motor.

4 Claims, 9 Drawing Figures

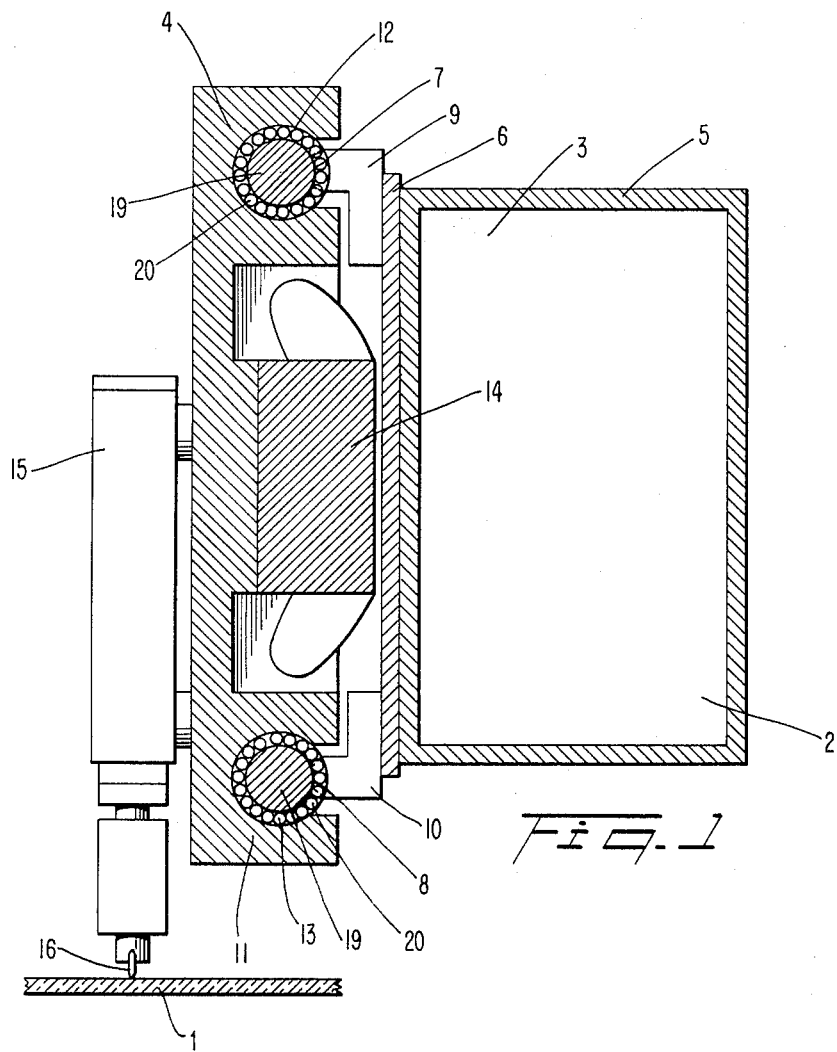
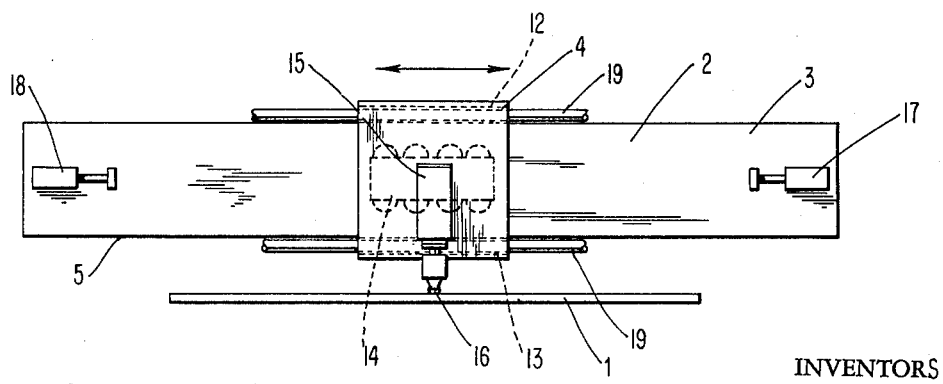

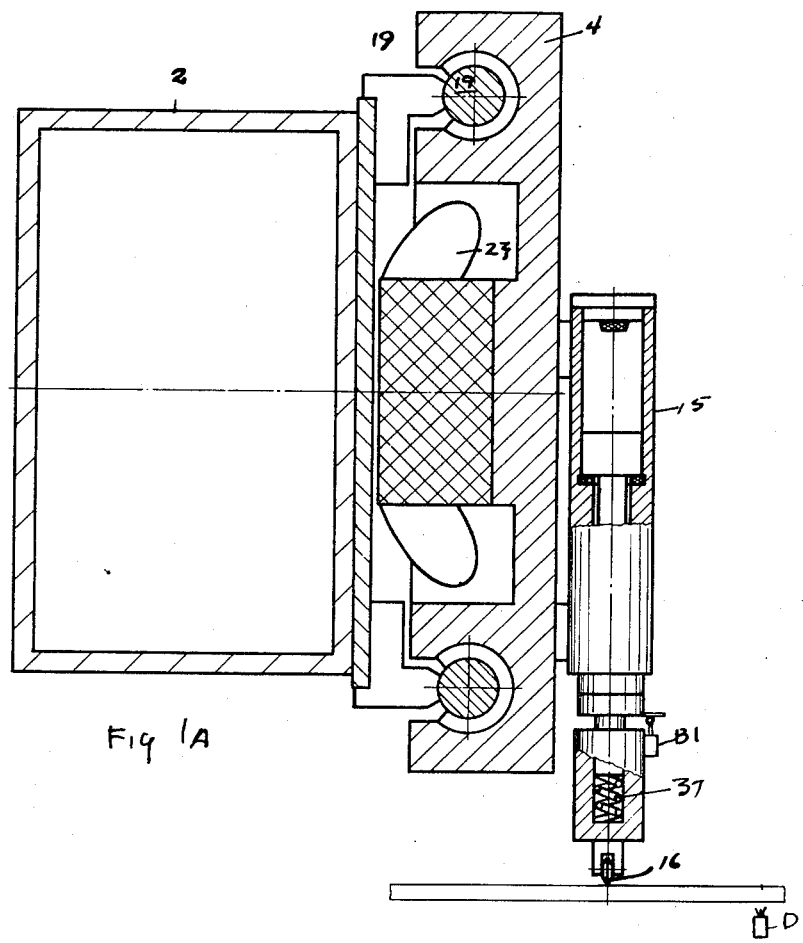
Fig 1A
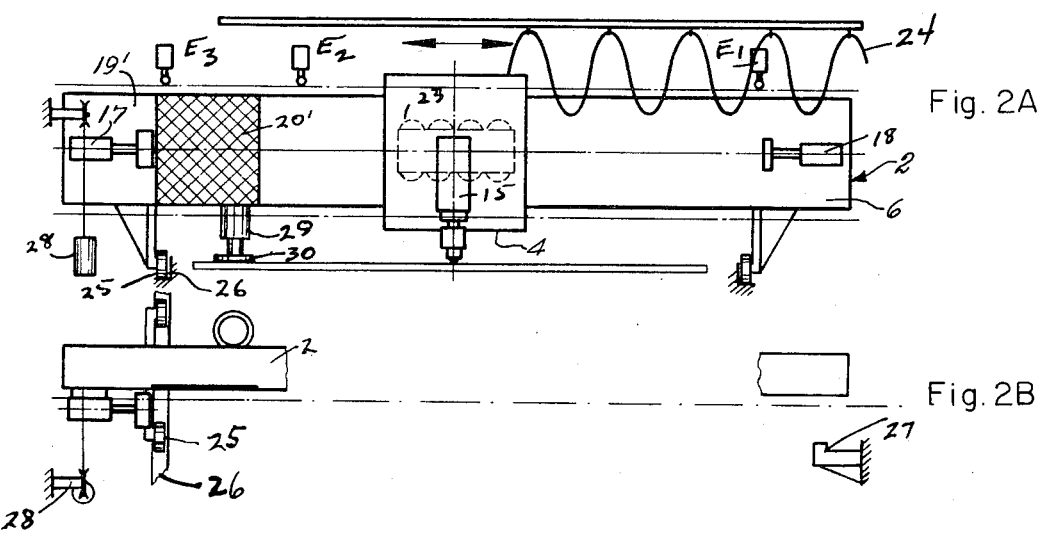
Fig. 2A
Fig. 2B

APPARATUS FOR CUTTING GLASS

This invention relates primarily to the cutting of flat glass. Flat glass is customarily made by extruding or drawing a ribbon of glass from a supply of molten glass, progressively cooling the ribbon until it is hard, scoring the surface of the glass with a diamond or hard steel point, and breaking off a sheet at the score line. The present invention concerns a cutting bridge of a new type.

In the prior art such apparatus included a bridge which extended across the glass ribbon, a movable carriage mounted on the bridge, and a sharp point carried by the carriage movable into and out of scoring position. The bridge could be either fixed or movable. The scoring point may be diamond dressed and aligned appropriately or, and this is generally the case, a point of special hard steel. The tool has generally been mounted on a support called the cutting head which included the means necessary to raise it and lower it and to apply it to the glass with adequate pressure. The cutting head was carried by the carriage. The present invention does not include the means of regulating the cutting tool as such means are well known. The cutting head has been provided with guide means and motive power to drive the carriage. In its simplest form, involving a straight—line cut, the cutting bridge usually involved a simple straight beam, the carriage being driven by an electric motor fixed to the bridge and acting through a chain drive. That type of apparatus has performed satisfactorily but has all the defects which are associated with mechanical transmissions including inaccuracies due to wear and maintenance.

An object of the present invention is to provide improved cutting means which includes a guide rail, a carriage movable along it and a cutting head supported by the carriage, which requires no mechanical transmission, does not become inaccurate by wear, and is controlled more easily and more accurately than cutting means of prior art type.

The objects of the invention are accomplished generally speaking by apparatus for cutting sheet glass which comprises a linear induction motor having a fixed part and a movable part, and cutting means attached to the movable part.

In this invention the movable carriage is driven along a guide rail or bridge by a linear induction motor, the carriage and the rail constituting the movable and fixed elements of the motor respectively. The linear motor of this invention is preferably an induction motor either having an inductive element attached to the bridge and an armature attached to the carriage or vice versa.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

The example hereinafter given is one in which the inductor is mounted on the carriage and the armature is part of the guiding bridge.

FIGS. 1 and 1a are cross sections showing different details through such apparatus;

FIGS. 2 and 2a are vertical elevations of the apparatus of FIG. 1 on a reduced scale showing different details;

FIG. 2B is a similar plan view of the apparatus of FIG. 1;

Figure 3:
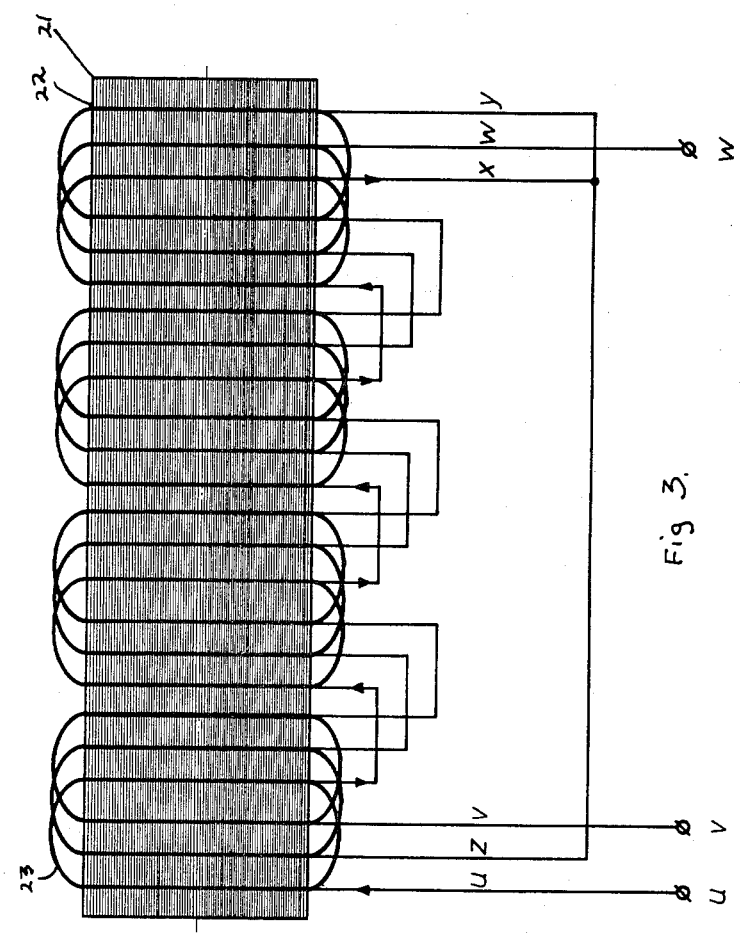
FIG. 3 shows the arrangement of coils in the 24 grooves of each of the three alternating phases $u\ v\ w$ on the plates of the inductor of motor M.

Referring to FIGS. 1 and 2 of the drawings wherein like reference numbers refer to like parts, the glass ribbon 1, which may be presumed to lie upon a table or on transporting means not shown, passes in a direction lying horizontally in the plane of FIG. 1, below the bridge 2 which will presumably be constructed to be selectively translatable in the aforesaid direction as a unit with the ribbon. Means for supporting the bridge for such translation are shown diagrammatically in certain figures. The bridge 2 includes a hollow metallic beam 5 shown as rectangular in transverse section, FIG. 1, and extending over ribbon 1, horizontally and transversely of its direction of travel. A carriage generally identified at 4, FIG. 1, is mounted upon the beam for guided translation therealong. A steel stator plate 6 is attached to one vertical surface of the beam and supports by means of brackets 9 and 10, upper and lower straight guide rails 19 for guiding a carriage in straight-line motion over and transversely of the direction of travel of the ribbon. The brackets are welded to the rails at 7, 8 at the ends of the latter. The moveable carriage 4 includes a frame 11 having two circular, elongated bearings 12, 13. Ball bearings 20 encircle the rails within bearings 12, 13 and act to positively guide the carriage in translation on and along the rails. The frame 11 carries an induction coil 14 and the cutting head 15 which is capable of applying the scribbing or cutting tool 16 vertically to the glass. The cutting head and its tool are not detailed. The linear induction motor includes the induction coil 14 mounted on the carriage frame and the armature formed by the hollow beam 5 and/or the reinforcing plate 6. When the coil is energized it moves the carriage and its bearings along rails 19.

In a particular construction the plate 6 had a height of 220 mm. and was 6 mm. thick. The purpose of the reinforcement is largely mechanical as it gives better rigidity to the bridge and makes it easier to adjust the rails, it being assumed that the rails will be adjustably mounted on the plate, but by offering a larger section to the circulation of induced currents it has in addition a valuable effect on the yield of the motor. The inductor 14 in this instance was composed (FIG. 3) of an assembly of 80 plates 21 with a useful surface of 270 × 80 mm. with 24 slots 22 for the reception of three phase coils 23. This motor was supplied with three phase current of 50 cycles at 380 volts by a flexible cable 24. The air gap between the inductor 14 and the stator plate 6 was about 0.5 mm. and the magnetic field developed in the air gap was on the order of 9,000 gauss.

The inductor can also be connected to a direct current circuit which, being activated at the end of its run acts as a brake. Contact switches $E_1$ to $E_3$ are mounted at selected points on the bridge to be activated by contact with the carriage to invert the phases and to close the direct current circuit. Pneumatic buffers 17 and 18 may be placed at the ends of the bridge 5 to arrest the carriage and position it for the return trip.

It is sometimes useful to provide a magnetic positioning means 19' at the head end of the bridge to precisely locate the starting point from which the carriage begins its cutting run. Furthermore the ends of the bridge in the zones from which the carriage begins its runs may include plates 20' of copper, or aluminum, or the like to generate stronger eddy currents and thus to provide a high energy start of the carriage. Such plates may be, for example, 0.5 mm. thick and set in grooves in the plate 6. They are sometimes useful but are not indispensable. They are particularly useful when magnetic positioners are employed for the carriage.

An example concerning a bridge for cutting moving glass ribbons is as follows, referring to the drawings:

The bridge 2, which is mounted on wheels 25, rolls along fixed rails 26, FIG. 2a, between four elastic abutments such as 27. It is urged into movement in a reverse direction, that is in a direction parallel with but opposite to the direction of movement of the ribbon of glass, by a counterweighing apparatus 28. It is provided with jacks 29 which carry friction disks or pads 30. When these disks are lowered into contact with the ribbon the bridge is captured by the ribbon and carried downstream as a unit therewith, thus permitting the tool 16 to make a straight cut transversely across the ribbon, after which the disks are raised and the bridge returned to its original position by the counterweight 28.

Figure 5:
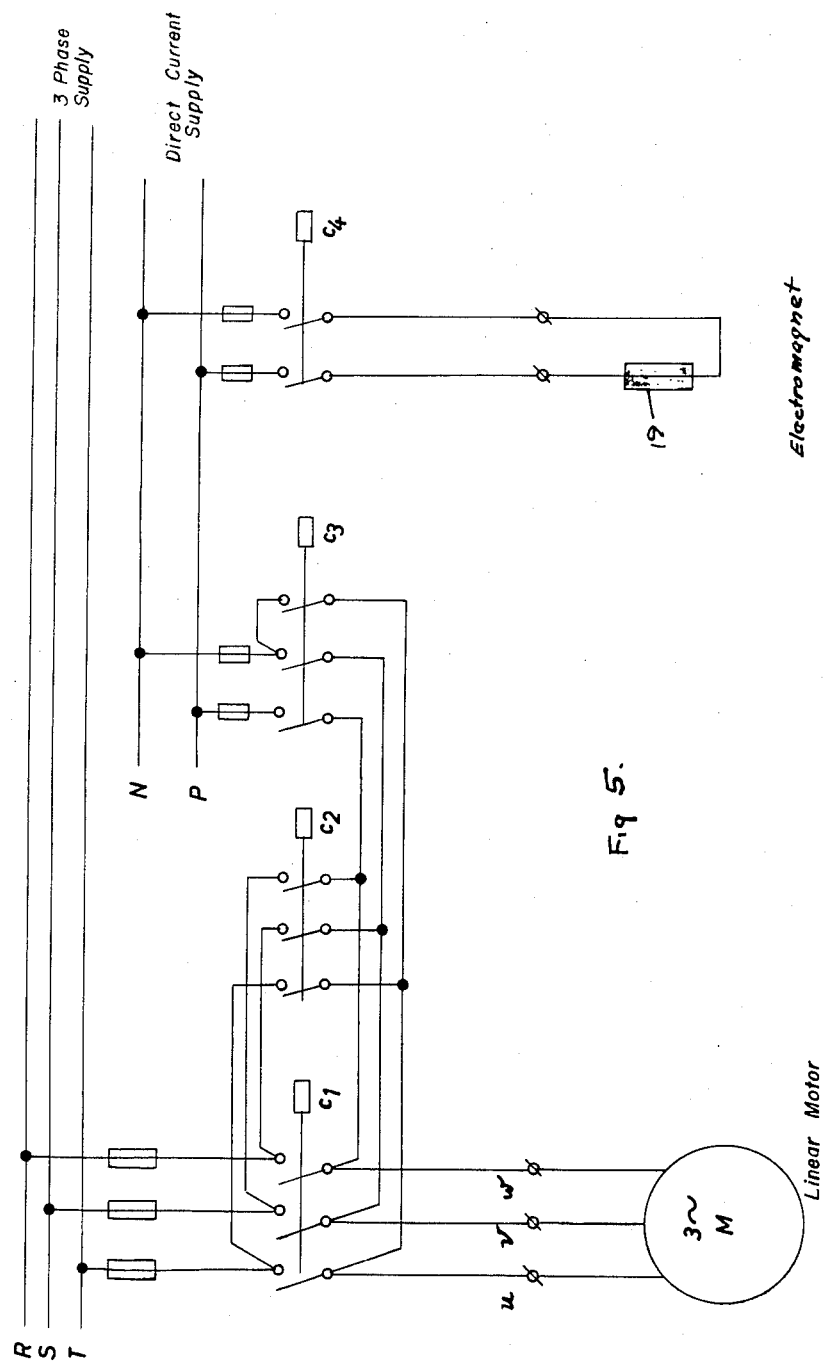
FIG. 5 shows the circuit diagram for the three phase supply R S T, for direct current supply N P, for go ($C_1$), reverse ($C_2$), braking ($C_3$) of motor M and the magnetic positioning ($C_4$) of the carriage.

Tool 16 is mounted on the piston of the cutting head by the interposition of a spring 37, FIG. 1A, which applies constant pressure. When it is in contact with the glass it closes the contact $b_1$ of contactor B which starts the operational cycle of motor M (FIG. 5).

Figure 4:
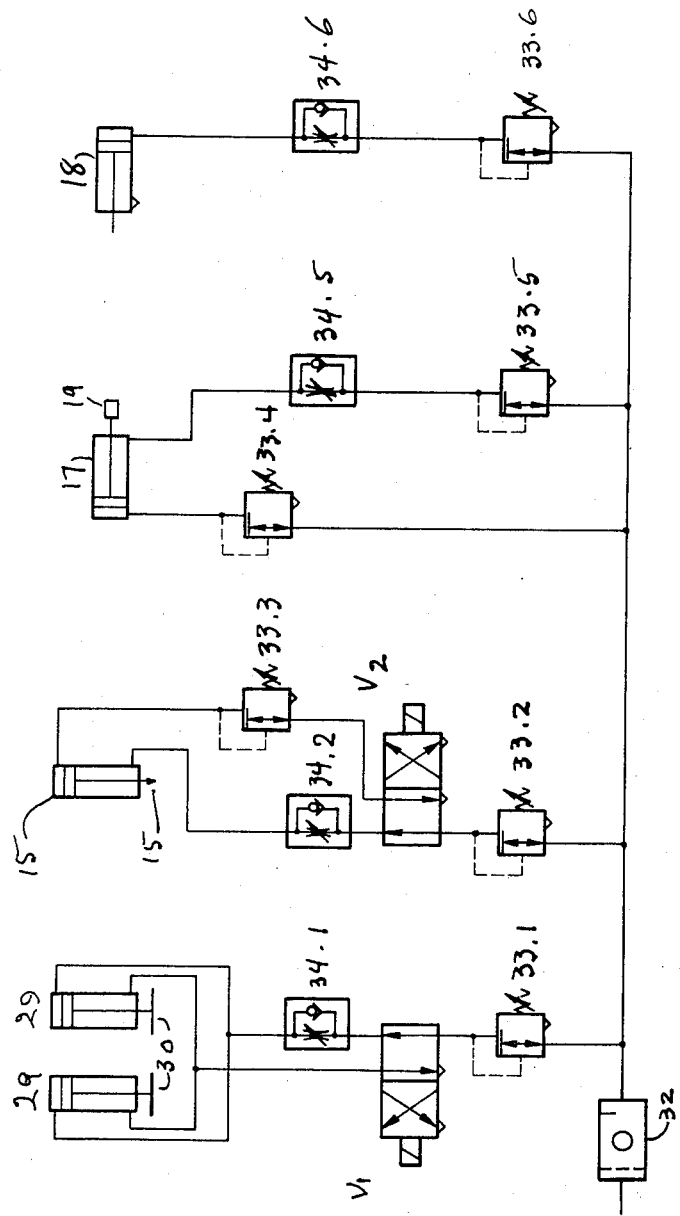
FIG. 4 shows the pneumatic command circuit for the cutting apparatus.
Figure 6:
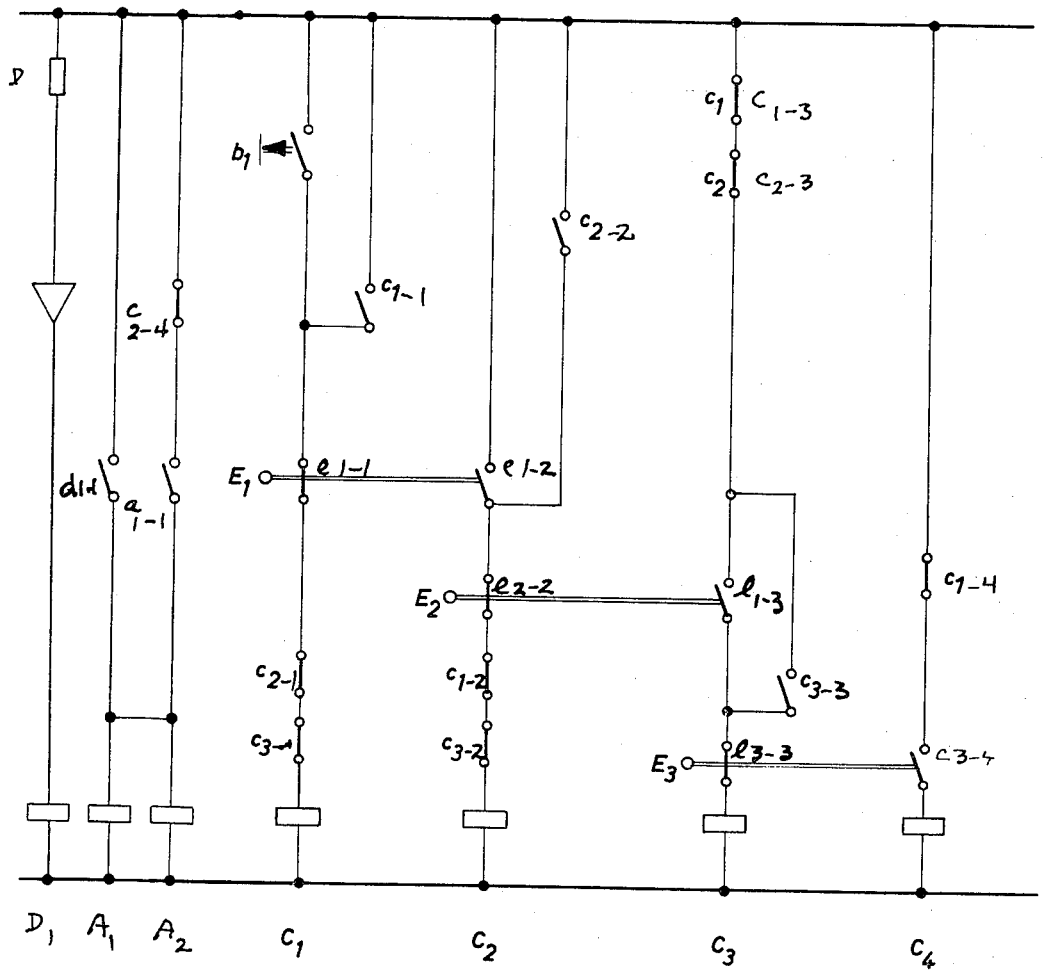
FIG. 6 shows the command circuit for the motor.

The pneumatic circuit is shown diagrammatically in FIG. 4. It includes four groups of pistons under pressure from a compressed air reservoir at 4 atmospheres. The pressure passes through the filtering means 32 and valves 33.1–33.6 which allows one to regulate the pressure in the lines at a selected value. These pistons are equipped with valves 34.1–34.6 which permit the flow of air in one direction only due to a bypass 35 equipped with a ball-type check valve. Two valves $V_1$ and $V_2$ permit the reversal respectively of the supply pistons 29 and 15. Under the effect of pressure the abutment 17 which carries the magnetic positioner 19' is applied to the edge of the ribbon 1 by means of rollers, which have been omitted to avoid complicating the figure, and deposit the tool 16 on this edge. The abutment 18 will normally be found in a position at the left of the figures. The supply of motor M is represented on FIG. 5, and the electrical circuit of command on FIG. 6. The carriage is found at rest before the contact $E_3$; the contact $e_{3.4}$ is closed and the carriage is immobilized by the electromagnet of the magnetic positioner 19'. A cutting mark passing in front of a photoelectric cell D activates relay $D_1$ which in its turn closes the contact $d_{1.1}$ and supplies the electromagnets $A_1$, $A_2$ with current. The electromagnet $A_1$ closes the contact $a_{1.1}$ of autoexcitation and displaces the electrovalve $V_1$ which causes the rapid descent of the friction pads 30 on the ribbon. The electromagnet $A_2$ activates the valve $V_2$ lowering tool 16, which occurs somewhat more slowly because it is retarded by brake 34.2. When the tool arrives in low position, the closing of contact $b_1$ activates relay $C_1$, closes excitation contact $c_{1.1}$, and opens contacts $c_{1.2}$, $c_{1.3}$, $c_{1.4}$ which cuts off the supply of relay $C_4$, inactivates magnetic positioner 19', and frees the cutting carriage which moves toward the right of the figure eventually returning to rest at $E_3$.

Carriage 4 strikes the contact $E_2$ without initiating any action, then touches contactor $E_1$ which cuts off the current for relay $C_1$ while activating $C_2$, self-excited by contact $c_{2.2}$. This reverses the supply to M, braking the carriage before reversing it. This movement is aided by abutment 18 upon which the carriage rebounds by the play of brake 34.6. At the same time the contact $c_{2.4}$ cuts off the supply of electrovalves $V_1$ and $V_2$, initiating the rapid raising of tool 16 followed by a lifting of sliders 30 retarded by the brake 34.1. The crossing of contact $E_2$ during the return of the carriage cuts off the current to relay $C_2$ to the profit of relay $C_3$ which energizes motor M with direct current and brakes it. At the end of the course $E_3$ cuts off the supply to $C_3$ and supplies relay $C_4$ of the positioner 19'. At the same time the abutment 17 recoils then, due to brake 33.5, returns slowly into contact with the edge of the sheet of glass and the cycle is ready for repetition.

The apparatus operates as follows, the carriage 4 being in starting position the inductor 14 is energized by alternating current and under the forces of induction leaves its position of rest, which may or may not include a magnetic positioner, and glides along the rails 19. At the end of its run the carriage hits contacts fixed to the bridge, which reverse the phases of the alternating current and consequently exert a strong braking force. Before it is fully stopped the carriage strikes pneumatic buffer 18 which impels it in the opposite direction. The action of the inverse magnetic field established by the inductor drives the carriage back toward its starting position. As it approaches the end of its return run the carriage hits another switch which admits direct current and brakes the carriage. It is subsequently stopped by the buffer 17, and by the magnetic positioner 19' when one is used. The carriage is then ready for a new cutting run. It will be understood that the cutting tool is lowered onto the glass at the beginning of its cutting run and raised from it at the end by customary means.

This apparatus is extremely accurate, readily controlled, and avoids the imperfections which characterize the cutting devices of the prior art. The combination of a linear motor for the drive and of ball bearings to guide the carriage has the advantage of achieving high cutting speeds, for instance 3 m. per second for the case hereinabove described, and of cadences such as less than 5 seconds total for a complete operation of a cut of 4.5 m. length. This operation is accompanied by a better quality of cut and a reduction of losses due to cutting accidents.

The apparatus is also useful for a moving cutting bridge, for instance accompanying the displacement of the ribbon of glass, as well as on a fixed bridge. It is particularly valuable to inscribe curved cutting lines and particularly to inscribe closed geometric figures. The guide bridge in this case is in effect the cutting templet which offers a variable section and the inductor can be placed flat on the templet.

The use of a linear induction motor as herein proposed produces a better cut, a truer line, and a higher speed than the cutting means of the prior art.

As many apparently widely different embodiments of the present invention may be made without departing from the spirit and scope thereof, it is to be understood that the invention is not limited to the specific embodiments.

What is claimed is:

1. Apparatus for severing into lengths a ribbon of glass moving horizontally in the direction of its length, said apparatus comprising an elongated beam, means mounting said beam over and adjacent the ribbon of glass transversely thereof to extend from one side of said ribbon to the other, a flat ferromagnetic stator plate fixed to the beam and to extend from one side of said ribbon to the other, guide means fixed with and extending along said beam, a carriage mounted upon said guide means for guided translation along said beam, a cutting tool carried by said carriage for movement as a unit therewith and for movement into and out of cutting contact with the ribbon, energizable three phase inductor coil means fixed with said carriage and in inductive relation with said stator plate, said inductor coil means being closely adjacent to said plate in constant spaced relation therewith throughout its movement with said carriage on and along said beam, said plate having a surface of copper or aluminum at one terminus adjacent the limit of travel of said carriage on and along said beam, said surface being in eddy current relation with said coil means when said carriage is at said terminus.

2. Apparatus according to claim 1 including magnetic positioning means for said carriage fixed with said plate at its said one terminus.

3. Apparatus according to claim 1 including circuit means controlling energization of said inductor coil means, by and in response to movement of said cutting tool into contact with the ribbon of glass below said beam and at one terminal position of said carriage on and along said beam.

4. Apparatus according to claim 3 including means actuated by movement of said carriage into its other terminal position on and along said beam for braking the speed of movement of said carriage, means separating the cutting tool from the ribbon of glass by and in response to movement of said carriage into said other terminal position, and means responsive to separation of the cutting tool from the ribbon to return said carriage along said beam into its said one terminal position.

* * * * *

UNITED STATES PATENT OFFICE
CERTIFICATE OF CORRECTION

Patent No. 3,797,339          Dated March 19, 1974

Inventor(s) Heinz Pape et al.

It is certified that error appears in the above-identified patent and that said Letters Patent are hereby corrected as shown below:

Column 5, line 10, after "and" delete "to extend" and substitute therefor --extending--.

Signed and sealed this 10th day of September 1974.

[SEAL]
Attest:

McCOY M. GIBSON, JR.
Attesting Officer

C. MARSHALL DANN
Commissioner of Patents